United States Patent [19]

Beaulier

[11] Patent Number: 4,695,876
[45] Date of Patent: Sep. 22, 1987

[54] METHOD AND APPARATUS FOR THE EXTRACTION OF LUMINANCE INFORMATION FROM A VIDEO SIGNAL USING A FIELD STORE

[75] Inventor: Daniel A. Beaulier, Menlo Park, Calif.

[73] Assignee: Ampex Corporation, Redwood City, Calif.

[21] Appl. No.: 885,992

[22] Filed: Jul. 15, 1986

Related U.S. Application Data

[63] Continuation of Ser. No. 482,118, Apr. 4, 1983, abandoned.

[51] Int. Cl.⁴ .............................................. H04N 9/78
[52] U.S. Cl. ....................................................... 358/31
[58] Field of Search ...................................... 358/31, 13

[56] References Cited

U.S. PATENT DOCUMENTS 4,291,331 9/1981 Devereux ............................. 358/13

FOREIGN PATENT DOCUMENTS

161484 9/1983 Japan ..................................... 358/31

Primary Examiner—John W. Shepperd
Attorney, Agent, or Firm—Donald L. Bartels; Bradley A. Perkins; Joel D. Talcott

[57] ABSTRACT

A method and apparatus for the extraction of luminance information from an analog composite video signal. Non-luminance information in the video signal is 180° out of phase between adjacent lines in adjacent fields of a video signal. Appropriately filtered adjacent fields are summed to cancel non-luminance information, leaving the desired luminance information. A field store is employed to allow the summing of adjacent fields by storing the present field to be summed with the next field of the video signal.

13 Claims, 4 Drawing Figures

FIG_1

FIG_2

FIG_3

FIG. 4

METHOD AND APPARATUS FOR THE EXTRACTION OF LUMINANCE INFORMATION FROM A VIDEO SIGNAL USING A FIELD STORE

This is a continuation of co-pending application Ser. No. 482,118 filed on Apr. 4, 1983, now abandoned.

BACKGROUND OF THE INVENTION

This invention relates in general to signal processing with reference to a composite video signal, and more particularly to the extraction of luminance information from a video signal on which color information has been encoded.

A broad range of signal processing is frequently performed on video signals upon which color information has been encoded. This includes not only the storing and subsequent retrieval of the video information from a wide variety of media, including magnetic tape, disk, and semiconductor memory devices, but also real time algorithmic type processing including color correction and noise reduction. In connection with such signal processing, it is freqeuntly desirable to reduce the video information contained in the composite video signal into its respective component forms, and thereafter perform the desired processing upon the respective components.

Basically speaking, a television picture is composed of a plurality of horizontal lines, each line containing color and brightness information for the respective portions along its length. The total number of said horizontal lines are further subdivided into two groups, or fields in such a manner that the respective lines of each field vertically interlace to form a single picture, or frame. The signal information for each location along each of said horizontal line is encoded in a single electronic signal commonly referred to as a composite video signal. The composite video signal contains both color as well as black and white information. The average DC level of said composite signal with reference to a horizontal line generally represents the corresponding black and white brightness information. Color information is contained on a 3.58 MHz subcarrier signal which is superimposed on said DC level. In particular, the amplitude of said subcarrier contains color saturation information, and the phase angle of said subcarrier with reference to a reference subcarrier contains the respective color information. As color information is phase encoded on the 3.58 MHz subcarrier, a 3.58 MHz reference signal is transmitted with each line of video information for reference purposes. The DC level of said video signal is generally referred to as containing the luminance information, and the 3.58 MHz subcarrier is generally referred to as containing the chrominance information.

From a mathematical standpoint, the encoded color information present in the chrominance signal can be represented as a vector having a magnitude proportional to the amplitude of said subcarrier and a phase angle proportional to the phase of said 3.58 MHz with reference to said reference signal.

In considering a composite video signal with reference to the frequency domain, the luminance signal would be composed of frequency components up to approximately 4.5 MHz. As chrominance information is contained on the 3.58 MHz subcarrier, it is clear that most chrominance frequency information will be centered about 3.58 MHz. From the foregoing it is apparent that chrominance information is present within the same frequency spectrum as luminance information.

In the processing of video signals, it is frequently desirable to extract the luminance and chrominance signal components from the composite video signal. Thereafter signal processing can be performed upon the luminance and chrominance signal components directly, from which the composite video signal can be subsequently reconstructed.

In dealing with the chrominance information, while said information is present in the amplitude and phase relations of the 3.58 MHz subcarrier, it is generally not convenient to perform the desired processing upon the chominance information in this form. Rather it is preferable to obtain chrominance information in its respective component form, i.e., the R - Y and B - Y components Several techniques are commonly used to extract chominance and luminance information from a composite video signal. In a first approach, a composite video signal is supplied to a bandpass filter having a center frequency of 3.58 MHz. The output from said bandpass filter will consequently contain primarily chrominance information. Luminance information can be thereafter derived by subtracting the output of the bandpass filter, i.e., the chrominance, from the composite video signal, thereby yielding the luminance signal. The respective R - Y and B - Y components are thereafter derived from the chrominance signal by a demodulation process. In particular, as the R - Y and B - Y signals represent the orthogonal components of the chrominance signal, said components are generally derived by multiplying the chrominance signal by a second signal. The R - Y component is generally derived by multiplying the said chrominance signal by a first reference signal having a frequency of 3.58 MHz. The resultant signal from said multiplication process is thereafter supplied to a low pass filter the output of which represents the corresponding R - Y orthogonal component in an analog format. In a similar fashion, the B - Y orthogonal component of chrominance is derived by multiplying the chrominance signal by a second reference signal having a frequency of 3.58 MHz and a phase difference from said first reference signal of 90°. Thereafter the result of said second multiplication process is supplied to a low pass filter, the output of which is an analog signal representative of the B - Y orthogonal component of the chrominance signal.

While the above approach will produce a luminance signal as well as the respective orthogonal components of the chrominance signal, there are a number of shortcomings. In particular, due to the fact that the luminance signal can have components in the frequency spectrum occupied by the chrominance signal, the bandpass filter employed in the above approach has limited abilities to effectively separate the luminance signal from the chrominance signal. Consequently luminance signal components are frequently present in the R - Y and B - Y output from the demodulation process.

An improved approach over the single bandpass system above described employs the operation of a comb filter. In particular the output from the bandpass filter is thereafter supplied as an input to a comb filter. The output from the comb filter represents the desired chrominance signal which is subsequently used for subtraction from the composite signal to generate a luminance signal, as well as the chrominance input for the demodulation process.

A comb filter may be implemented by taking advantage of certain phase relationships present in the 3.58 MHz subcarrier between subsequent lines, fields and frames in a composite video signal generated in accordance with the National Television System Committee standard RS-170A as promulgated by the Electronic Industries Association, or the Phase Alternating Line standard, hereinafter referred to as NTSC and PAL respectively.

In a composite video signal, the phase relation of 3.58 MHz subcarrier will change between subsequent lines in a field, as well as adjacent lines in adjacent fields. In particular there is a 180° phase shift of the 3.58 MHz subcarrier between corresponding points on adjacent lines within the same field in a composite video signal generated according to the NTSC standard, and a 90° phase shift between corresponding points on adjacent lines within the same field in a composite video signal generated according to the PAL standard. It is also observed that a 180° phase shift exists between corresponding points on certain adjacent lines between two fields in a video signal produced according to both the NTSC and PAL standard. This phase shift can be used to an advantage in the extraction of chrominance information from a composite video signal.

In the foregoing approach employing a bandpass filter to produce a chrominance signal, by supplying the output from said bandpass filter to a delay means capable of delaying said chrominance signal by an amount equal in time to one horizontal line in the NTSC system, or two horizontal lines in the PAL system and thereafter subtracting the results from the output from the bandpass filter, the result of said process will be a signal from which luminance components have been removed and chromiance components present therein will have been doubled. This signal can then be used as an input to the demodulator for subsequent production of the R - Y and B - Y orthogonal components of the chrominance signal, as well as subtracted from the composite video signal produce a luminance signal.

While this approach can be used to produce performance superior to that achievable with the use of a bandpass filter alone, a number of shortcomings nevertheless remain. These shortcomings generally relate to the point in the video signal at which said 180° phase shift occurs. In the NTSC system, the point at which a 180° phase shift has occurred is available at the corresponding point in either the subsequent line in the same field, or the corresponding point on an adjacent line in the next succeeding field. In this regard it will be particularly observed that the amount of change in luminance between subsequent lines in the same field and adjacent lines in a subsequent field can vary considerably. This problem is further compounded in the PAL system wherein the phase shift between corresponding points on subsequent lines in a single field is 90°. Consequently the amount of delay necessary for the video signal in the PAL system required for a 180° phase reversal is two horizontal lines within a field. Clearly the amount of change in luminance possible between two horizontal lines in the PAL system further compounds the problem. In the NTSC and PAL systems, however, there is a 180° phase shift between corresponding points on certain adjacent lines between adjacent fields. Consequently by delaying the chrominance signal by an amount in time equal to one field, the necessary 180° phase shift is possible with a minimum change in luminance in both the NTSC and PAL systems. However, this approach requires storing a substantial amount of video information, as the required delay is one field of 263 lines in the NTSC systems and one field of 312 lines PAL systems.

In the past, the storage of a complete field of video information has been achieved by digitizing the composite video signal and storing the results therefrom in a storage device. This storage device is commonly a semiconductor memory device. It will however be noted in this approach that as the composite video signal was initially digitized in the composite form, subsequent operations performed thereon necessarily must be performed in the digital domain. In particular, the mathematical operation of substracting the digitized form of the component composite video information from the digitized video composite signal stored in the storage means to produce a chrominance signal, as well as the implementation of the subsequent bandpass filter must be performed in the digital domain. The digital results of the signal subsequent to the bandpass filter would represent chrominance information which could thereafter be subtracted from the digitized composite video signal to produce a signal representative of chrominance. However, the R - Y and B - Y orthogonal components of the chrominance signal must still be extracted from the digitized chrominance signal. As this necessarily requires a multiplication process, implementation of same in the digital domain is particularly complex and requires extensive hardware. Efforts in this area are documented in Croll, M. G., 1980, *A Digital Storage System For an Electronic Colour Rostrum Camera*, IEE Conference Publication No. 191, 252–255, and Clarke, C. K. P., 1982, *High Quality Decoding For PAL Inputs to Digital YUV Studieos*, IEE Conference Publication No. 220, 363–366.

Consequently while it is observed that minimum changes in luminance will occur between subsequent lines on adjacent fields, implementation of this approach in the past has necessited extensive amounts of hardware to perform the required digital signal processing.

SUMMARY

In the present invention, the disadvantages and limitations present in prior art techniques for the extraction of luminance information employing the digitizing of the analog composite video signal for storage in a frame store, and the subsequent required implementation of a bandpass filter in the digital domain have been obviated.

In the present invention a field store is employed to obtain the necessary 180° phase reversal from the non delayed video signal between adjacent lines in adjacent fields thereby minimizing the effects of changes in luminance. In particular the composite analog video signal is supplied to a low pass filter having a cut off frequency below the 3.58 MHz subcarrier frequency. The output of the low pass filter is supplied to an amplifier having differential outputs. The noninverting output from said amplifier is supplied as a first input to a first summer. The composite analog video signal is supplied as the second input to the first summer. The output from the first summer is subsequently supplied as the input to a first analog to digital converter. The inverting output from said amplifier is supplied as a first input to a second summer. The analog composite video signal is supplied as a second input to the second summer. The output from the second summer is supplied as an input to a second analog to digital converter. The output from the second analog to digital converter is supplied as an input to a storage means which functions to store the digitized output from the second summer for one complete field. The output from said storage means is thereafter supplied as a first input to a third summer. The output from said first analog to digital converter is supplied as a second input to the third summer. The output from the third summer represents luminance information in a digital format. Consequently luminance information is continuously extracted from a composite analog video signal.

In a particular embodiment of the present invention, luminance information may be separated from an analog composite video signal and digitized for storing on an individual field basis for use in an electronic storage system wherein a single field of video information is stored. In this regard, an inverted video signal is developed from the composite video signal. The inverted signal is low pass filtered above a selected frequency in the band width of the composite signal during the first field. The color subcarrier frequency is subtracted from the composite signal during the first field and is converted to a first digital signal. During the second field the noninverted video signal is low pass filtered and this filtered signal is subtracted from the composite signal and converted to a second digital signal. The first and second digital signals are added which digitally encodes the luminance information of the composite video signal.

DETAILED DESCRIPTION

Figure 1:
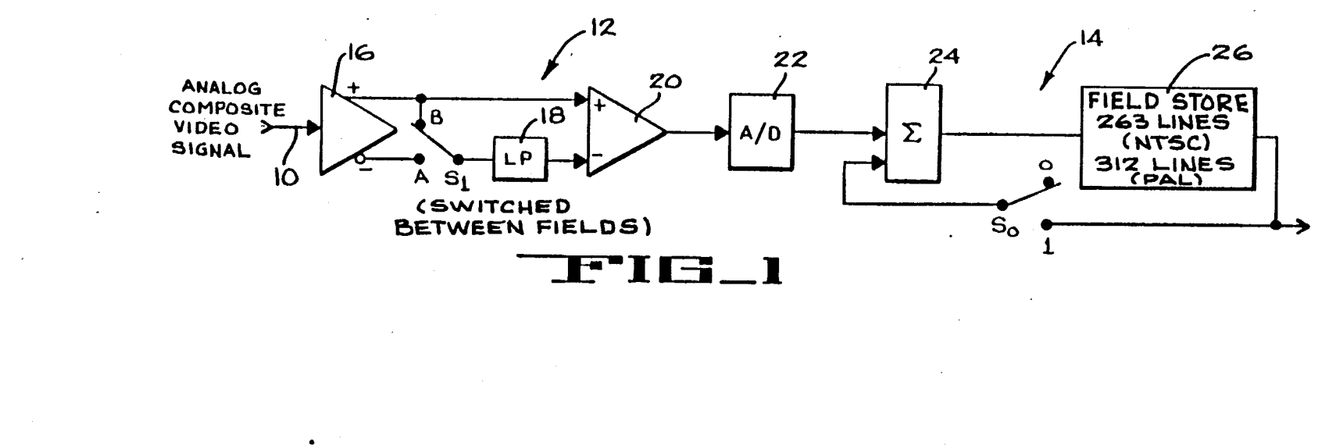
FIG. 1 illustrates in a functional block form a method and apparatus for the extraction of luminance information from an analog composite video signal on a field basis in accordance with the present invention.

FIG. 1 illustrates a source of analog composite video signal 10, an analog processing section 12 and a two field comb filter 14 for the extraction of luminance information from an analog composite video signal in accordance with the present invention. Analog processing section 12 includes differential output amplifier 16, a switch S1, a lowpass filter 18, a differential input amplifier 20 and an analog to digital conveter 22. Filter 14 includes a digital summer 24 and a digital field store 26.

Source 10 applies the analog composite video signal to differential output amplifier 16. Differential output amplifier 16 develops a non-inverted video signal at its non-inverting output and an inverted video siganl at its inverting output. It is clear that the inverted video signal appearing at the inverting output from differential output amplifier 16 is the same signal as the non-inverted video signal which appears at the non-inverting video output of amplifier 16, only shifted in phase by 180°. The non-inverted signal is applied to the non-inverting input of differential input amplifier 16 and to a pole B of switch S1. The inverted signal is applied to a pole A of switch S1. Switch S1 selectively switches the signal occurring at either pole A or B for application to a low pass filter 18. Low pass filter 18 attenuates the signals applied thereto above a selected frequency, the selected frequency being less than the frequency of the color subcarrier of the composite video signal. The attenuated signal developed by low pass filter 18 is applied to the inverting input of differential input amplifier 20. Differential input amplifier 20 subtracts the signal occurring at its inverting input from the signal applied to its non-inverting input and develops a subtracted signal. The subtracted signal is applied to analog to digital conveter 22. Analog to digital converter 22 converts the subtracted signal into a digital signal. The digital signal is applied to a first input of digital summer 24. The output of digital summer 24 is coupled to an input of field store 26. The output of field store 26 is coupled to a second input of digital summer 24.

The chroma separation process requires two fields to complete. During the first field, switch S1 is placed in position A, switch S0 is placed in position 0.

Figure 2:
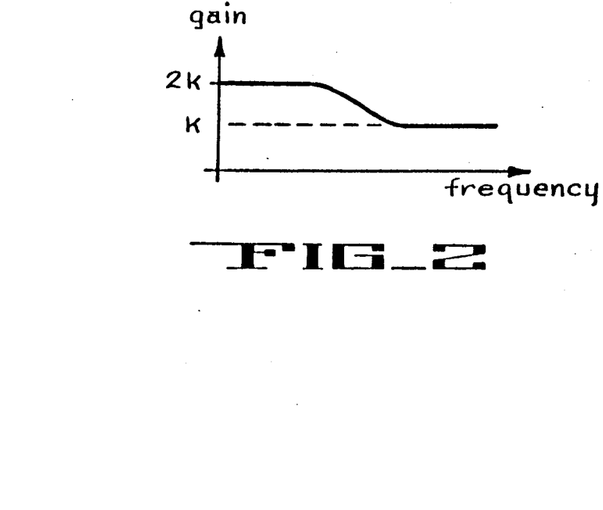
FIG. 2 illustrates the frequency response of a portion of the circuit illustrated in FIG. 1 with switch S1 in position A.

Placing S1 in position A will filter the analog video signal producing an output from analog processing section 12 according to the transfer function $K(1\ LP(s))$, where $LP(s)$ is the response of lowpass filter 18, and where K includes any gain factors of amplifier 16 and 20. For low frequencies, $LP(s)=1$, producing a gain of 2K. For frequencies above the cutoff frequency of lowpass filter 18, $LP(s)=0$, producing a gain of K. This is shown symbolically in FIG. 2. Signal components near subcarrier will be subjected to a gain of K, while low frequency luminance components will be subjected to a gain of 2K.

The filtered anlog signal is thereafter converted to a digital form by analog to digital converter 22 and stored in field store 26. At the end of the first field, switch S1 is placed in position B, switch So is placed in position 1.

Figure 3:
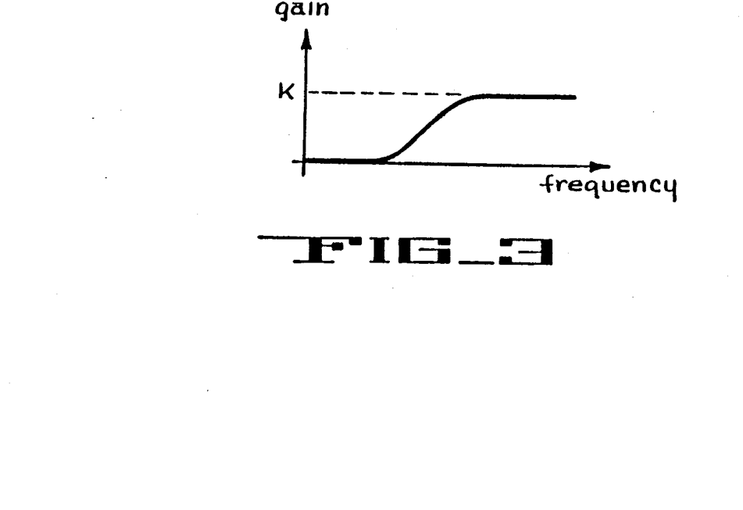
FIG. 3 illustrates for frequency response of a portion of the circuit illustrated in FIG. 1 with switch S1 in position B.

Placing S1 in position B will filter the analog video signal according to the transfer function $K(1-LP(s))$. For the low frequencies, $LP(s)=1$, producing a gain of 0; for frequencies above the cutoff frequency of filter 18, $LP(s)=0$, producing a gain of K. This is shown symbolically in FIG. 3. Signal components near subcarrier will again be subjected to a gain of K, but low frequency luminance components will be blocked.

Adder 24 will combine the filtered digitized signal of field 2 with the data being output from field store 26. As noted earlier, luminance information tends to repeat in phase from field to field. For any such signal, the net transfer function at the output of adder 24 would be the sum of the individual transfer functions realized by analog processing section 12 during the two fields. In particular this would be $K(1+LP(s))+K(1-LP(s))=2K$. This illustrates that all information which is in phase from field to field will be subjected to a uniform gain.

As noted earlier, subcarrier information reverses phase from field to field. It is also possible for luminance information to change phase from field to field. The transfer function for any signal which changes phase from field to field is the difference of the above two transfer functions, $K(1+LP(s))-(K1-LP(s))=2K(LP(s))$. This illustrates that information which changes phase from field to field is not passed in the same manner as information which is field coherant, but instead is lowpass filtered.

Thus the net effect of the process is to remove from the composite signal only the high frequency components which change from field to field; that includes chroma information. In-phase high frequency components and all low frequency components regardless of phasing, pass with the identical gain of 2K.

The output of adder 24 is rewritten into field store 26 until the end of the second field, at which time field store 26 will contain chroma free data suitable for recording or other purposes. To achieve this effect, field store 26 must be 263 lines long for an NTSC system and 312 lines long for a PAL system.

It will be observed that the above approach is insensitive to small variations in analog parameters. In particular small changes in response to the pass band in the low pass filter will effect only diagonal luminance components. In a similar manner imblance in the differential gains present with reference to amplifier 16 and 20 will only cause small differences in gain between in phase and diagonal luminance information. As the desired separation requires only that the low pass filter have a response near zero at the subcarrier frequency, it is clear that the foregoing practical limitations have minimal effect.

It is likewise observed from the foregoing that as the low pass filter 18 as well as signal processing elements consisting of amplifiers 16 and 20 operate in the analog domain, and are present in the analog signal processing prior to the conversion to the digital domain, it is not necessary in the present invention to implement the functions of the low pass filter in the digital domain. This results in significant simplification of the required signal processing.

The principles of the present invention can be further extended to the extraction of luminance information from a composite analog signal on a continuous rather than a field basis. A functional block diagram of such a device incorporating the present invention is illustrated in FIG. 4.

Figure 4:
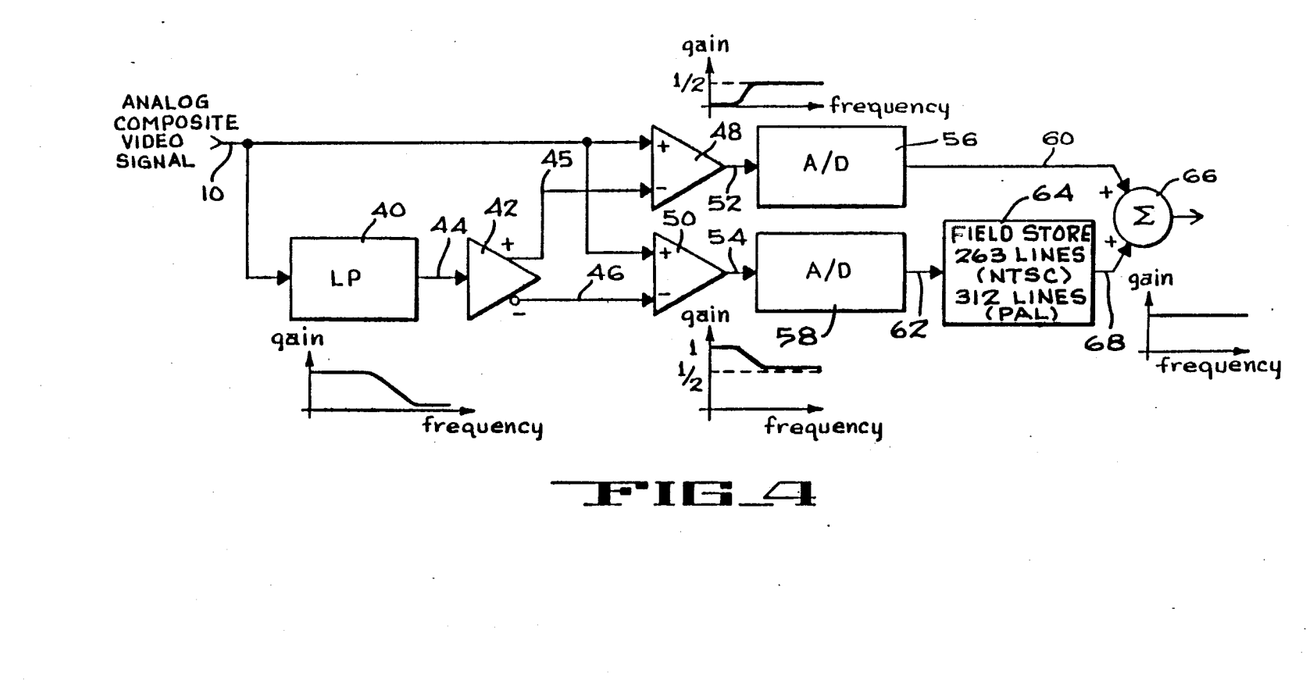
FIG. 4 illustrates in a functional block form a method and apparatus for the extraction of luminance information from an analog composite video signal on a continuous basis in accordance with the present invention.

Referring now to FIG. 4 composite video signal 10 is applied to low pass filter 40 and as a first input to differential amplifier 42. Low pass filter 40 functions to pass frequencies below the frequency of the 3.54 MHz subcarrier in output signal 44. Output signal 44 from low pass fiilter 40 is supplied as an input to amplifier 42. Amplifier 42 produces a differential output signal having a non-inverting output 44 and an inverting output 46. The non-inverting output 46 from amplifier 44 is applied as a second input to differential amplifier 48. The inverting output from amplifier 42 is supplied as a second input to differential amplifier 50. The composite video signal 10 is supplied as a first input to differential amplifier 50. Differential amplifier 48 and 50 function to produce output signals 52 and 54 respectively equal to the sum of input signals 10 and 44 and 10 and 46 respectively. The output 52 from differential amplifier 48 is thereafter supplied as an input to the first analog to digital converter 56. The output 54 from differential amplifier 50 is supplied as an input to second analog to -digital converter 58. Analog to digital converters 56 and 58 function to convert their respective analog input signals 52 and 54 respectively to the corresponding digital representation 60 and 62 respectively. The output 62 from analog to digital converter 58 is supplied as an input to field store means 64. Field store means 64 functions to store the digital input 62 thereto. Field store means 64 may be implemented in numerous manners including semiconductor memories. Field store 64 functions to store the digital representation of the analog signal 54 corresponding to a field of video information according to the PAL video standard, and the NTSC video standards. To achieve this effect, field store 26 must be 263 lines long for an NTSC system and 312 lines long for a PAL system. The output signal 60 from first analog to digital converter 56 is supplied as a first input to summing means 66. The output 68 from field store means 64 is supplied to a second input to summing means 66. Summing means 66 functions to perform the addition in a digital format of the respective inputs thereto producing an output signal 68 equal to the sum of the respective input signals thereto. The output signal 68 represents luminance information in a digital format.

The above described method and apparatus to extract luminance information from a composite video signal operates as follows.

The output of differential amplifiers 48 and 50 will consist of analog video filtered information according to the functions $K(1=LP(s))$ and $K(1+LP(s))$ respectively. After digitization the output of differential amplifier 50 is delayed by for an interval corresponding to one field, 263 lines for an NTSC system and 312 lines for a PAL system, and added to the digitized output of differential amplifier 48 by means of adder 66. It is clear that the result of this addition is identical to that of the previous discussions, specifically that field coherant information is passed with a gain of 2K while information which reverses phase from field to field is low pass filtered according to the function $2K(LP(S))$. The distinction between the implementation of FIG. 1 and FIG. 4 is that the implementation of FIG. 4 results in a continuous process whereas that of FIG. 1 does not. Thus the implementation of FIG. 1 is suitable primarily for freezing action at some point in time, whereas the implementation of FIG. 4 would be suitable for decoding of normal real time television images on a continuous basis.

While the foregoing has disclosed a method and apparatus for the extraction of luminance information from a composite video signal employing digital techniques, many modifications to the foregoing would be apparent witnout departing from the inventive concepts embodied herein to one having ordinary shill in the art. Consequently the foregoing descriptions are not be interpreted in a limiting manner. Rather, the inventive concept herein is to be limited only by the following claims.

What is claimed is:

1. Apparatus for extracting luminance information from a video signal composed of first and second fields of a plurality of frequency components wherein a plurality of high frequency components, containing non-luminance information, are out of phase by 180° from the first to the second fields, the apparatus comprising:
   first filter means responsive to the video signal of the first field for analogly producing a filtered first field signal comprised of those signals having frequency components below the selected frequency increased in amplitude by twice a constant gain and those signals having frequency components above the selected frequency increased in amplitude by the constant gain;
   second filter means responsive to the video signal of the second field for analogly producing a filtered second field signal comprised of those signals having frequency components below the selected frequency decreased in amplitude to zero and those signals having frequency components above the selected frequency increased in amplitude by the constant gain;

analog-to-digital conversion means responsive to the filtered first field signal for producing a digitized first field signal that is a digital representation of the filtered first signal, and responsive to the filtered second field signal for producing a digitized second field signal that is the digital representation of the filtered second field signal;

delay means responsive to the digitized first field signal for digitally producing a delayed first field signal that is the digitized first field signal delayed by a period of a field; and summing means responsive to the delayed first field signal and the digitized second field signal for extracting the luminance information by digitally summing the delayed first field signal and the digitized second field signal so that out of phase non-luminance components cancel.

2. The apparatus of claim 1 wherein the first filter means comprises:

a differential output amplifier responsive to the video signal of the first field for producing an inverted video signal and a non-inverted video signal, the inverted video signal being identical to the non-inverted video signal except shifted in phase by 180°;

a low pass filter responsive to the inverted video signal for attenuating signals above the selected frequency to produce low pass filtered video signal; and a differential input amplifier responsive to the non-inverted video signal applied to its non-inverted input and responsive to the low pass filtered video signal applied to its inverted input to produce the filtered first field signal by subtracting the inverted low pass filtered video signal from the non-inverted video signal.

3. The apparatus of claim 1 wherein the second filter means comprises:

a differential output amplifier responsive to the video signal of the second field for producing a non-inverted video signal;

a low pass filter responsive to the non-inverted video signal for attenuating signals above the selected frequency to produce low pass filtered video signal; and a differential input amplifier responsive to the non-inverted video signal applied to its non-inverted input and responsive to the low pass filtered video signal applied to its inverted input to produce the filtered first field signal by subtracting the low pass filtered video signal from the noninverted video signal.

4. The apparatus of claim 1 wherein the selected frequency is less than a color subcarrier frequency of the video signal.

5. The apparatus of claim 1 wherein the delay means comprises a field store.

6. Apparatus for extracting luminance information from a video signal composed of successive fields of a plurality of frequency components wherein a plurality of high frequency components, containing non-luminance information, are out of phase by 180° from field to successive field, the apparatus comprising:

filtering means responsive to the video signal for analogly producing a first and second filter output signal so that the first filter output signal contains the low frequency components present in the video signal and the second filter output signal contains the low frequency components present in the video signal shifted in phase by 180°;

a first summing means responsive to the video signal and the first filter output signal for analogly producing a first output signal equal to the difference between the video signal and the first filter output signal;

a second summing means responsive to the video signal and the second filter output signal for analogly producing a second output signal equal to the difference between the video signal and the second filter output signal;

a first conversion means for producing a first digitized signal which is a digital representation of the first output signal;

a second conversion means for producing a second digitized signal which is a digital representation of the second output signal;

a delay means responsive to the second digitized signal for digitally producing a delayed signal which is delayed by the period of a field; and summing means responsive to the delayed signal and the first digitized signal for extracting the luminance information by digitally summing the delayed signal and the first digitized signal so that out of phase non-luminance components cancel.

7. The apparatus of claim 6 wherein the filter means comprises:

low pass filter means responsive to the video signal for analogly producing a filtered signal; and amplifier means responsive to the filtered signal for producing a first and second signal so that the first signal is identical to the filtered signal and the second signal is shifted in phase by 180° from the filtered signal.

8. The apparatus of claim 6 wherein the delay means comprises a field store.

9. Apparatus for extracting luminance information from first and second television fields of an analog video signal composed of a plurality of frequency components, said fields of video information composed of lines of video information, wherein a plurality of low frequency components present in the analog video signal are out of phase by 180° from said first to said second fields, said apparatus comprising:

filter means responsive to the first and second television field defining an analog video signal for analogly producing a filtered output signal so that the filtered output signal comprises only those frequency components present in the analog video signal above a selected frequency and attenuated by one half for the second filtered output signal defining the first television field, and those frequency components present in the analog video signal above the selected frequency are attenuated one half, and those frequency components below the selected frequency are not attenuated, for the first filtered output signal defining the second television field;

analog-to-digital conversion means responsive to the first and second filtered output signals for respectively producing a first and second digital signal in a digital format;

delay means responsive to said second digital signal for digitally delaying said second digital signal by a period of one field to produce a delayed signal; and summing means responsive to the first digital signal and to the delayed signal for extracting luminance information by digitally summing the delayed signal and the first digital signal so that out of phase non-luminance components cancel.

10. Apparatus for producing luminance information from a first and second television field of an analog video signal composed of a plurality of frequency components, said apparatus comprising:

amplifier means responsive to the analog video signal for producing a first and second amplified signal so that the first amplified signal is equal to the analog video signal and the second amplified signal is equal to the analog video signal shifted in phase by 180°;

filter means responsive to the second amplified signal on the first television field and responsive to the first amplified signal on the second television field for producing a filter output signal from which frequency components originally present in the filter input signal above a selected frequency have been removed;

difference means responsive to the first amplified signal and the filter output signal respectively for producing a difference output signal equal to the difference between the first amplified signal and the filtered output signal, the first amplified signal having an amplitude of zero below the selected frequency and having an amplitude equal to that of the second amplified signal above the selected frequency, and below the selected frequency the second amplified signal having an amplitude of twice the amplitude of the first and second amplified signals above the selected frequency;

analog-to-digital conversion means responsive to the difference output signal for producing the difference output signal in a digital format;

summing means responsive to the difference output signal in a digital format and a difference output signal in a digital format delayed in time by a constant time delay for producing a digital summed output signal equal to the difference output signal in a digital format for the first television field and equal to the sum of the difference output signal in a digital format and the difference output signal in a digital format delayed in time by a constant time delay for the second television field; and delay means responsive to the digital summed output signal for producing the luminance information composed of the sum of the difference output signal in a digital format and the difference output signal in a digital format delayed in time by a constant time delay, said constant time delay such that adjacent lines of the first digitized signal and the second delayed digital signal are out of phase when summed.

11. Method for extracting luminance information from a video signal composed of first and second fields of a plurality of frequency components wherein a plurality of high frequency components, containing non-luminance information, are out of phase by 180° from the first to the second fields comprising the steps of:

analogly producing a filtered first field signal comprised of those signals having frequency components below the selected frequency increased in amplitude by twice a constant gain and those signals having frequency components above the selected frequency increased in amplitude by the constant gain in response to the video signal of the first field;

analogly producing a filtered second field signal comprised of those signals having frequency components below the selected frequency eliminated and those signals having frequency components above the selected frequency increased in amplitude by the constant gain in response to the video signal of the second field;

producing a digitized first field signal that is a digital representation of the filtered first field signal, and responsive to the filtered second field signal for producing a digitized second field signal that is the digital representation of the filtered second field signal;

digitally producing a delayed first field signal that is the digitized first field signal delayed by a period of a field; and digitally summing the delayed first field signal and the digitized second field signal so that out of phase non-luminance components cancel so as to extract the luminance information.

12. Method of extracting luminance information from a video signal composed of successive fields of a plurality of frequency components wherein a plurality of high frequency components, containing non-luminance information, are out of phase by 180° from field to successive field comprising the steps of:

analogly producing a first and second filter output signal so that the first filter output signal contains the low frequency components present in the video signal and the second filter output signal contains the low frequency components present in the video signal shifted in phase by 180°;

analogly producing a first output signal equal to the difference between the video signal and the first filter output signal;

analogly producing a second output signal equal to the difference between the video signal and the second filter output signal;

producing a first digitized signal which is a digital representation of the first output signal;

producing a second digitized signal which is a digital representation of the second output signal;

digitally producing a delayed signal which is delayed by the period of a field; and digitally summing the delayed signal and the first digitized signal so that out of phase non-luminance components cancel so as to extract the luminance information.

13. A method for producing luminance information from a first and second television field from an analog video signal composed of a plurality of frequency components, comprising the steps of:

filtering the analog video signal for the second television field to produce a second field filtered output signal comprising only those frequency components present in the analog video signal above a selected frequency and attenuated by one half;

filtering the analog video signal for the first television field to produce a first field filtered output signal comprising those frequency components present in the analog video signal below a selected frequency and those frequency components present in the analog video signal above a selected frequency attenuated by one half;

converting the first field filtered output signal and the second field filtered output signal to a first field filtered digital output signal having a digital format representative of the first field filtered signal, and a second field filtered digital output signal having a digital format representative of the second field filtered signal respectively; and adding the second field filtered digital output signal to the first field filtered digital output signal delayed in time by a constant amount to produce summed digital output signal, said constant time delay such that adjacent lines of the first digitized signal and the second delayed digital signal are out of phase when summed.

* * * * *

UNITED STATES PATENT AND TRADEMARK OFFICE
CERTIFICATE OF CORRECTION

PATENT NO. : 4,695,876

DATED : September 22, 1987

INVENTOR(S) : Daniel A. Beaulier

It is certified that error appears in the above-identified patent and that said Letters Patent is hereby corrected as shown below:

```
Column  1, line 23, delete "freqeuntly"  insert --frequently--;
Column  4, line  3, delete "263" insert --262--;
           line 39, delete "necessited" insert --necessitated--;
Column  5, line 59, delete "siganl" insert --signal--
Column  6, line 12, delete "conveter" insert --converter--;
           line 23, delete "K(1 LP" insert --K(1 + LP--;
           line 33, delete "anlog" insert --analog--;
           line 62, delete "(K1 - LP(s))  insert --K(1 - LP(s))--;
Column  7, line 14, delete "imblance" insert --imbalance--;
           line 42, delete "fiilter" insert --filter--;
Column  8, line 18, delete "K(1=LP(s))" insert --K(1-LP(s))--;
           line 42, delete "witnout" insert --without--;
           line 43, delete "shill" insert --skill--.
```

Signed and Sealed this

Twelfth Day of April, 1988

Attest:

DONALD J. QUIGG

*Attesting Officer*

*Commissioner of Patents and Trademarks*